United States Patent [19]

Taube

[11] 4,318,266
[45] Mar. 9, 1982

[54] REMOTELY CONTROLLED SELF-PROPELLED POWER LAWN MOWER

[76] Inventor: Max Taube, 3322 Cat Cay Rd., Lantana, Fla. 33462

[21] Appl. No.: 216,687

[22] Filed: Dec. 15, 1980

[51] Int. Cl.³ .................... B62D 5/00; A01D 75/28
[52] U.S. Cl. .................... 56/10.2; 56/10.5; 56/DIG. 15; 180/79.1
[58] Field of Search .............. 56/10.2, 10.5, DIG. 15; 340/694; 180/79.1, 167

[56] References Cited

U.S. PATENT DOCUMENTS

| | | | |
|---|---|---|---|
| 3,720,281 | 3/1973 | Frownfelter | 180/167 |
| 3,800,902 | 4/1974 | Keller | 56/10.5 |
| 3,856,104 | 12/1974 | Ohba | 180/167 |
| 4,145,864 | 3/1979 | Brewster | 56/DIG. 15 |
| 4,177,426 | 12/1979 | Gaishin et al. | 340/694 |
| 4,180,964 | 1/1980 | Pansire | 56/10.2 |

Primary Examiner—Robert A. Hafer
Attorney, Agent, or Firm—Samuel Lebowitz

[57] ABSTRACT

A self-propelled gas engine-operated lawn mower adapted to be controlled by a remotely positioned operator holding a radio transmitter, which is capable of transmitting radio signals of differentiating characteristics. A radio receiver mounted on the lawn mower controls servomotors, which in turn operate microswitches and relays assembled therewith to selectively energize a plurality of reversible electric motors which are coupled mechanically with the steering wheel, traction wheels and the transmission between the latter and the main driving shaft of the engine. These motors control the steering, the speed of propulsion of the mower in both forward and reverse directions and the engagement and disengagement of the drive to the traction wheels to start and stop the mower at the will of the operator. The stopping of the mower is also enforced in the event the operator is incapacitated and unable to exert his will, thereby imposing a "dead-man's control" to stop the travel of the mower in such a contingency. Additional refinements include the remote control of the throttle adjustment of the carburetor to control the engine speed, and the complete inactivation of the engine.

35 Claims, 15 Drawing Figures

REMOTELY CONTROLLED SELF-PROPELLED POWER LAWN MOWER

This invention relates to a self-propelled power lawn mower which may be remotely controlled by a radio control system.

It is the object of the present invention to provide a remote control system for a self-propelled power lawn mower which is rugged and reliable in operation and economical in construction.

It is another object of the present invention to make possible the remote control of a power lawn mower by an operator distant therefrom, without any need for extraneous ground-embedded or exposed wiring.

It is another object of the invention to adapt a power lawn mower for fine and accurate control of its operations by radiant energy to the same degree as is possible with the manual control thereof. These control operations include the steering of the lawn mower, the rate of movement or propulsion of the mower both in a forward and reverse direction, the starting and stopping of the mower in either of these directions, and a throttle control for the engine. All of these controls are executed by an operator preferably within the range of vision of the mower, carrying a portable radio transmitter capable of transmitting at least signalling energy of seven differentiating characteristics which are received in a radio control box mounted on the mower, for selective control of the circuits and mechanisms for executing the above-mentioned operating functions.

The essential mechanisms of the invention are adapted for ready installation on existing self-propelled power lawn mowers with minimum structural changes of the latter, or, of course, they may be included in the construction of new machines of different types. The cost of incorporating these mechanical parts and assemblies in either existing or newly-built machines is nominal, since such devices, or varying embodiments thereof, have been used in other industrial locales and for different purposes for many years. Consequently, their wide use over long periods in their respective industrial and control fields has eliminated the need for the research and development thereof and the consequent high costs of these assemblies. For example, the remote control of devices of all types, such as toys, vehicles of both large and small sizes, model airplanes, model boats and the like, have been known and practiced for many decades. These employ multi-channel transmitters and receivers. An example of such communication systems may be found in the recent U.S. Pat. No. 4,177,426, Dec. 4, 1979, wherein reference is made to several assembly manuals for building 8-channel digital proportional radio control transmitters, all of which are incorporated herein by reference. The present invention is beyond the scope of invention characterizing such systems, since any available one can be used as long as the transmitter is capable of sending signals of many differentiating characteristics to a receiver of such signals mounted on the controlled power lawn mower.

The present invention seeks to simplify the remote control of vehicles by radiant energy, as exemplified by the disclosures in U.S. Pat. Nos. 2,769,601, Nov. 6, 1956, and 3,800,902, Apr. 2, 1974, dealing with aircraft and lawn mowers, respectively.

Other objects and purposes will appear from the detailed description of the invention following hereinafter, taken in conjunction with the accompanying drawings, wherein.

In the drawings is shown a self-propelled lawn mower which has been adapted to be controlled remotely by mounting thereon the necessary mechanical and electrical components which respond to radio signals emanating from a multi-channel digital proportional radio control transmitter (FIG. 15), held by an operator and controlled by him to broadcast differentiating signals for controlling the several functions of the mower as described above. The lawn mower in the illustrated embodiment may be of the type shown in U.S. Pat. Nos. 3,529,482, Sept. 22, 1974, and 3,568,421, Mar. 9, 1971, which are designated in the commercial field as the "SNAPPER" lawn mowers. Any other self-propelled lawn mowers operated by internal combustion engines may be adapted as well for remote control by modifying the hardware components for attaching the actuating elements to the motor frame.

Figure 1:
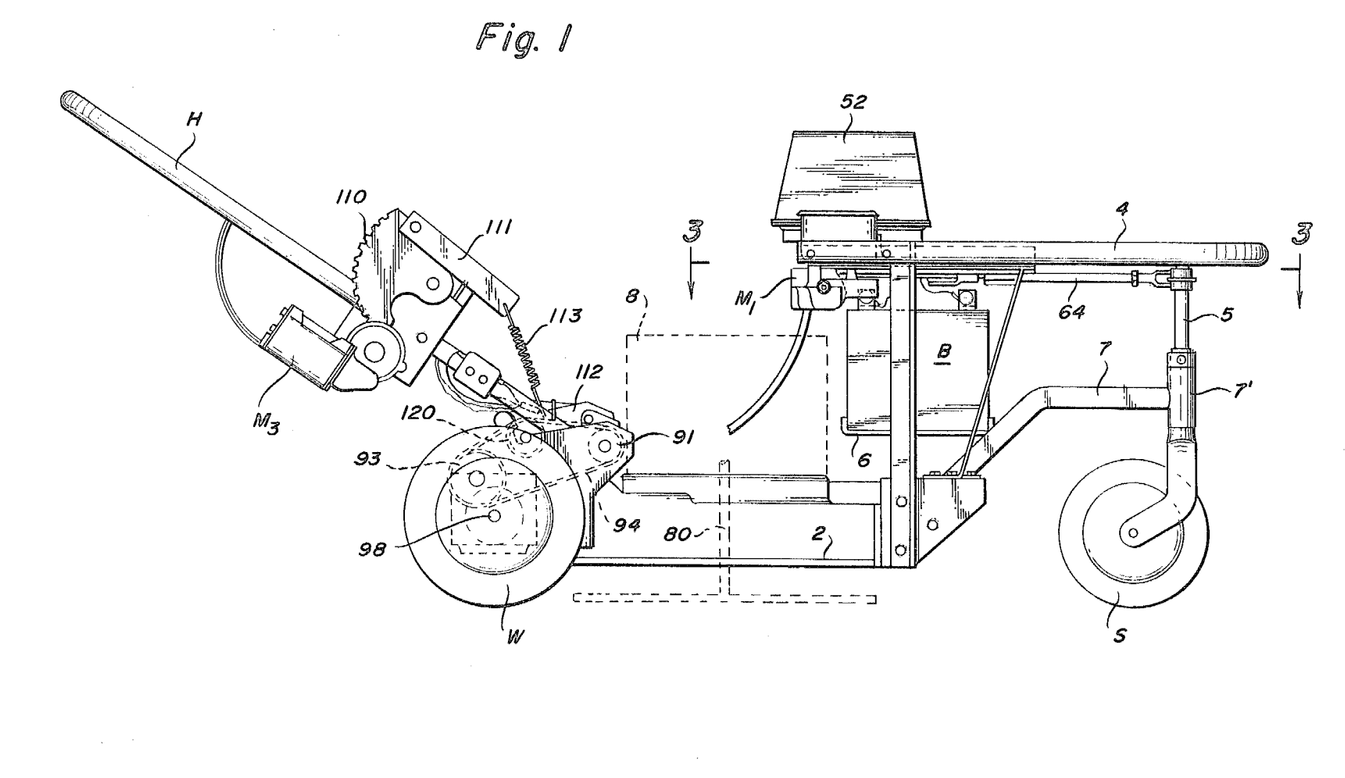
FIG. 1 is a side elevation of an illustrative embodiment of a self-propelled lawn mower to which have been applied the necessary mechanisms for effecting the remote control thereof.
Figure 2:
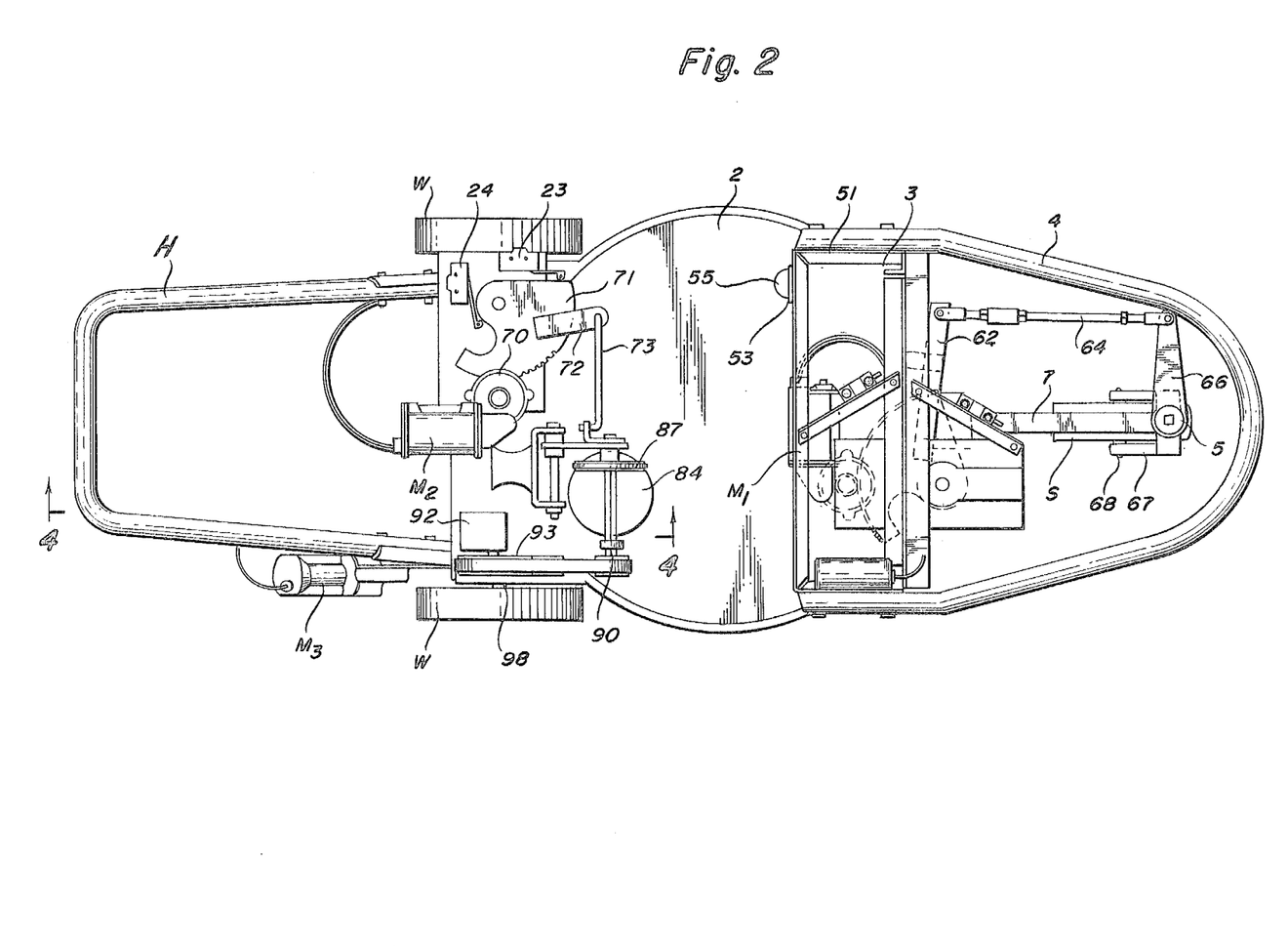
FIG. 2 is a plan view of the mower with the internal combustion engine and the electrical control box removed from the top thereof, to illustrate more clearly the relative disposition of the control assembly.
Figure 3:
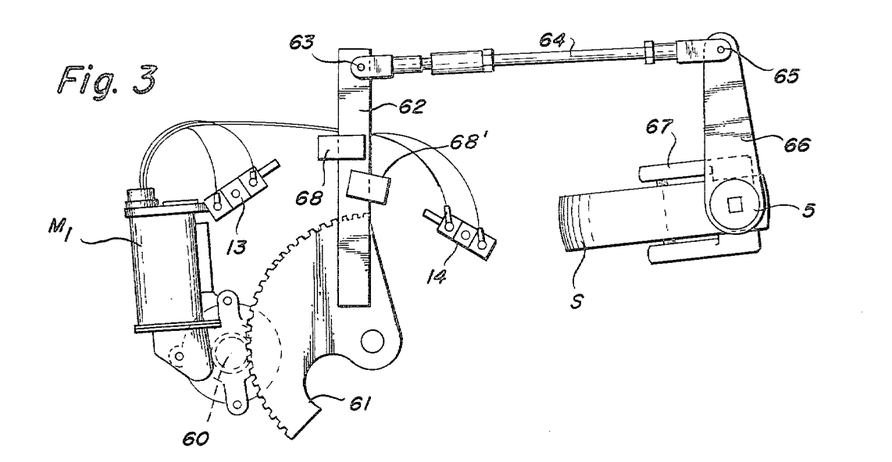
FIG. 3 is a horizontal sectional view along line 3—3 of FIG. 1, on an enlarged scale.

As shown in FIGS. 1 and 2, the mower frame 1 has a handle H at one end and a non-driven ground-engaging steering wheel S at the opposite end, with a platform 2 between them for supporting an internal combustion engine, indicated in dotted lines 8. The latter operates a central vertical drive shaft 80 for the rotary cutting element, which extends above ground level between the pair of traction wheels W mounted on a driving axle 98 at the rear end of the frame. A strut 7, extends from the front of the frame for supporting a vertical sleeve 7' in which is rotatably mounted a shaft 5 which is bifurcated at its lower end 67 to support the steering wheel S, on axle 68, in an adjustable vertical plane. A guard frame 4 extends forwardly at the upper portion of the frame, beyond the steering wheel, to prevent damage to the latter and its support and controlling linkage, in the event that the mower runs into any obstruction.

A shelf 6 is mounted on the frame 1 rearwardly of the strut 7, for supporting a storage battery B, which may have a rating of twelve volts and thirty-two amperes, for providing energy for the electrical components on the mower, as more fully described hereinafter.

Figures 9, 10:
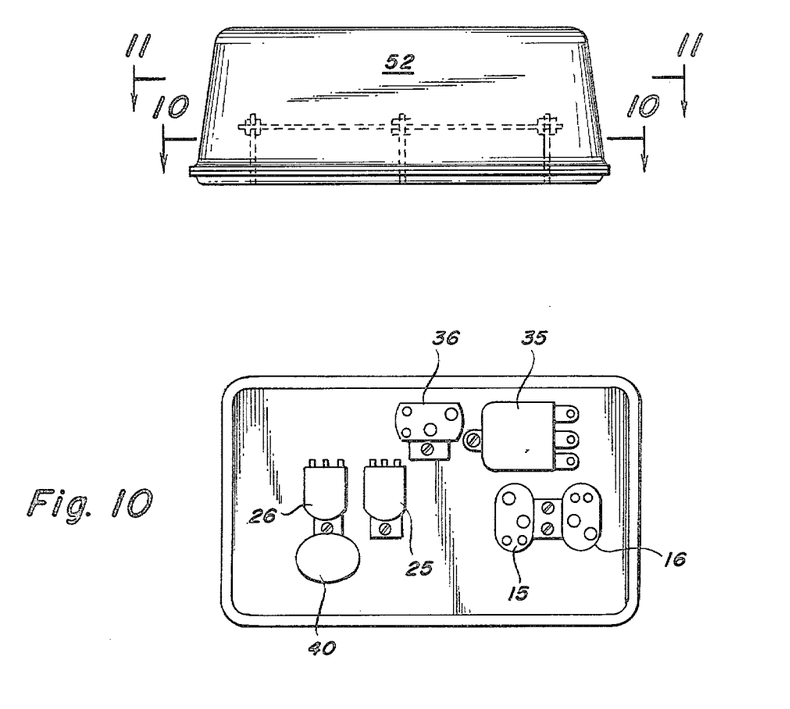
FIG. 9 is a right end view of the electrical control box at the top of the mower for housing the radio receiver, servomotors, microswitches and relays for executing the necessary controls of the lawn mower mechanism.
FIG. 10 is a horizontal sectional view along line 10—10 of FIG. 9.
Figure 11:
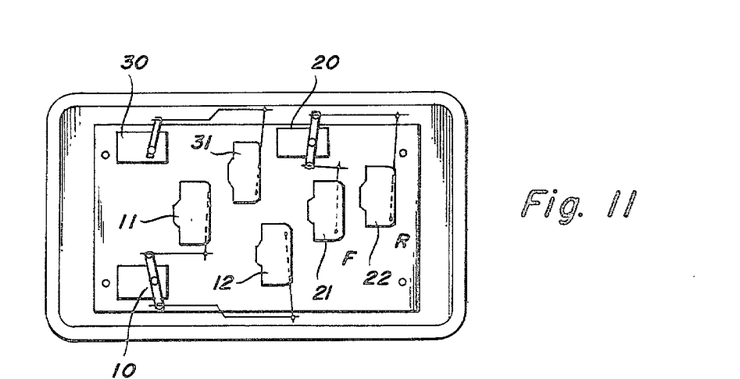
FIG. 11 is a horizontal sectional view along lines 11—11 of FIG. 10.

A framed support 51 of structural angle iron (FIG. 2), is disposed horizontally at the upper portion of the frame for supporting a radio control box 52 which houses the servomotors and relays as well as the radio receiver (FIGS. 9, 10 and 11), for receiving the radiant energy transmitted thereto by the transmitter. The frame 51 also supports on its rearward edge, a vertical control panel 53, on which is mounted a servomotor 55 above the carburetor of the engine 8. A mechanical linkage between the latter and the servomotor, which is responsive to one of the distinctive signal channels of the transmitter T, controls the throttle valve and consequently the engine speed. Such controls in the field of model aircraft are known, and U.S. Pat. No. 3,784,174, Jan. 8, 1974, is illustrative of such. This servo 55 may also respond to another distinctive signal from the transmitter to inactivate the engine.

FIGS. 2, 3 and 10 to 12, illustrate the mechanical and electrical components of the mower for remotely controlling its steering.

The motor M1, one of the three motors serving to execute the multiple functions described above, may be of the type generally used for operating automobile car windows, as disclosed in U.S. Pat. Nos. 2,763,508, Sept. 18, 1956, and 2,848,218, Aug. 19, 1958. These motors are reversible direct-current series motors adapted to be energized by battery B on the mower. The closure of the circuit to this motor operates the gear sector 61 through the intermediary of gearing 60 to move the gear sector either in a counterclockwise direction when steering of the mower is desired to the left, or in a clockwise direction when the steering is desired in a direction to the right from the normal plane of the steering wheel in the straight-ahead direction, which coincides with the longitudinal central vertical plane of the mower.

Figure 15:
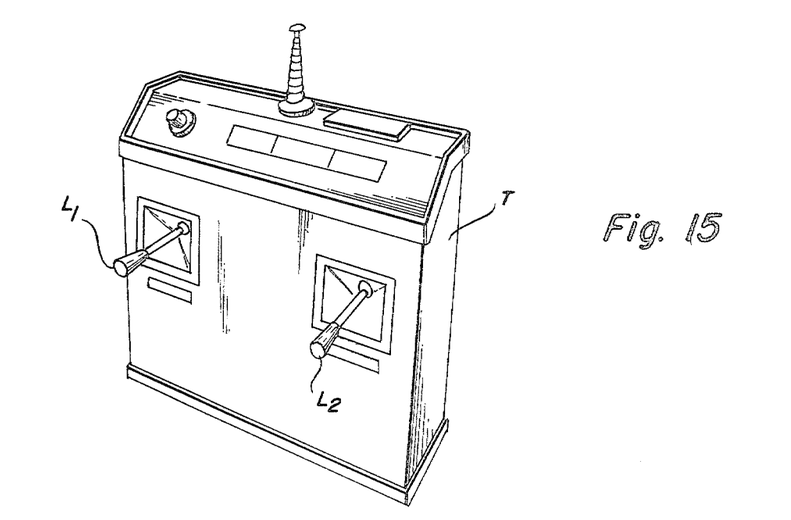
FIG. 15 is a perspective view of the radio transmitter for controlling the several functions of the lawn mower.

The transmitter shown in FIG. 15 of the drawings is provided with two control levers L1 and L2. When movement of the mower to the left is desired, the operator shifts control lever L2 to the left from its neutral position, and when movement of the mower to the right is desired, this lever L2 is shifted to the right from that position. With the lever L2 in central or neutral position, the steering wheel is in the longitudinal median plane of the mower and the mower moves in a straight line forwardly, or rearwardly when the mower is in an activated condition. The lever L2 may remain in its set positions from its neutral position, to maintain a predetermined steering angle until a variation in steering angle is desired.

The servomotors or servos and the microswitches and relays controlled by them are mounted on two levels of the radio control box 52 mounted on the mower. Limit switches are disposed at several points of the mower frame to control further the operation of the motors.

Servo 10 (FIGS. 11 and 12), responds to the signal from the transmitter when the operator desires to steer the mower from a straight line. If a turn to the left is indicated, armature 10a of the servo strikes armature 11a of switch 11 to close the circuit at relay 11 from ground G to contact 11c and through closed limit switch 13, (13c, 13a and 13b), winding 15w of relay 15 between its terminals 15c and 15d, battery B and ground. The attraction of armature 15a of relay 15 completes a circuit between its terminals 15b and 15d, battery B and ground, through field winding 17 and armature 18 of motor M1 to ground. The operation of motor M1 rotates gear sector 61 in a counterclockwise direction (FIG. 3), and moves lever 62, rigidly attached to the latter, to the left. A mechanical linkage 64 is pivotally connected at one end to the outer end 63 of lever 62, and at its opposite end 65 to lateral arm 66 which is rigidly fastened to the upper end of rotary shaft 5. The linkage 64 is adjustable in length, as by a turnbuckle, to control finely the angular movement which may be imposed on arm 66 between limit switches 13 and 14 mounted on the frame in the path of movement of the abutments 68,68' affixed to the lever 62.

Figure 12:
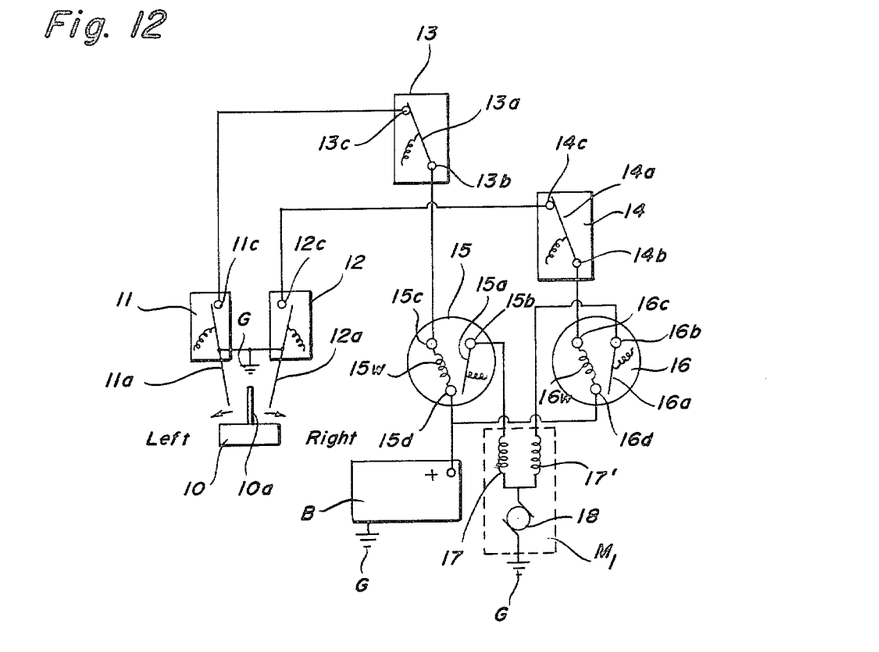
FIG. 12 is a circuit diagram of the electrical components for controlling the steering of the mower.

The motor M1 is activated as long as the lever L2 is held in position for a left turn to any desired angle up to a safe limit of 26° to 30° from center. A release of the lever L2 and a return to its neutral position stops the motor M1 by returning armature 10a of the servo to its neutral position which permits armature 11a of the switch 11 to break the circuit at contact 11c which interrupts the circuits of relay 15 and motor M1. This action leaves the steering wheel in its adjusted position for any desired arc of movement.

The steering wheel may have a range of angular movement of about 26° to 30° from the longitudinal axis, and with the capability of a similar amount of movement in the opposite direction for executing a turn to the right. The steering wheel has a capability of turning a total of approximately 52°, and in no case more than 60°.

If the lever L2 is held until the limit of the turn is reached, abutment 68 on lever 62 strikes armature 13a of limit switch 13 to open the circuit at 13b,13c, to relay 15 and the motor, to stop the energization of the latter, until such time as a turn to the right is initiated.

Upon the transmission of a signal for a right turn by shifting lever L2 to the right, servo 10 actuates armature 10 to rock armature 12a of switch 12 into contact with terminal 12c. This completes a circuit through closed limit switch 14, (14c,14a,14b), relay 16 (16c,16w,16d), battery B and ground, to attract armature 16a and thereby to complete the circuit through the armature 18 and field winding 17' of motor M1, armature 16a of the relay and battery B. This winding 17' of the servo motor M1 effects rotation of the motor in the reverse direction, to rotate gear sector 61 in a clockwise direction until such time as the control lever L2 is released by the operator for automatic return to its neutral position. When this happens, the relay and motor circuits are broken at 12a and 12c, which serves to stop the steering wheel at any degree of turn from its maximum limit to the left to any other point on the left, to its central position, or to any point to the right, depending upon the position of gear sector 61 when the motor was stopped. If the lever L2 is held by the operator to the limit of the right turn capability, abutment 68' strikes armature 14a of limit switch 14 (FIGS. 2 and 3), which breaks the circuit of relay 16 between contacts 14a and 14c as well as the motor circuit at contact 16d. This stops the motor M1 even if the operator holds the lever L2 in the right turn position, before he releases it for automatic movement to its neutral position or in position for a left turn, when the mode of operation described above is repeated.

In addition to the capability of the lever L2 of the transmitter to steer the lawn mower to the left or to the right, by shifting the lever horizontally from its neutral central position to the left or to the right, respectively, as described above, this lever also serves to control the propulsion of the mower in a forward or rearward direction by shifting the lever upwardly for forward motion and downwardly for rearward motion, both movements of the lever being in a vertical plane.

The propulsion of lawn mowers at variable speeds, and the reversal of the direction thereof by means of wheel and disc transmissions, are known, and U.S. Pat. Nos. 3,445,991, May 27, 1969, and 3,529,482, Sept. 22, 1970, are illustrative of such. The transmission arrangement disclosed in the latter patent has been modified in the illustrated embodiment of the instant invention in order to adapt it to the remote control thereof, which changes are indicated in FIGS. 1, 2 and 6 to 8. As shown in these figures, the driving torque from the main vertical rotary shaft 80 between the internal combustion engine and the rotary cutting blade is transmitted to the rotating pulley 82 on stub shaft 81 which is mounted on the upper wall of the housing 75. An endless transmission belt 83 extends between pulley 82 and a driving pulley on the shaft 80 (not shown).

Figure 7:
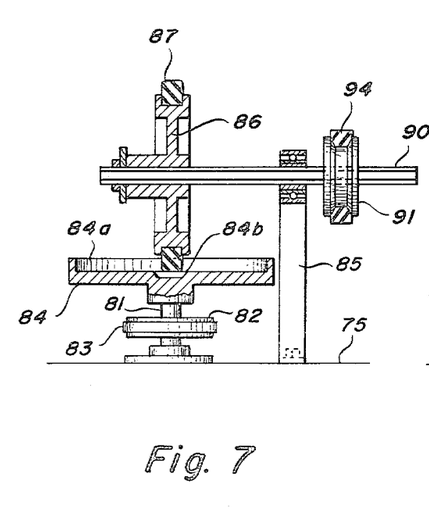
FIGS. 7 and 8 are vertical sectional views along line x—x of FIG. 6, illustrating the position of the parts for stopping the propulsion of the lawn mower and for reversing the direction of the mower at a reduced speed, respectively.
Figure 8:
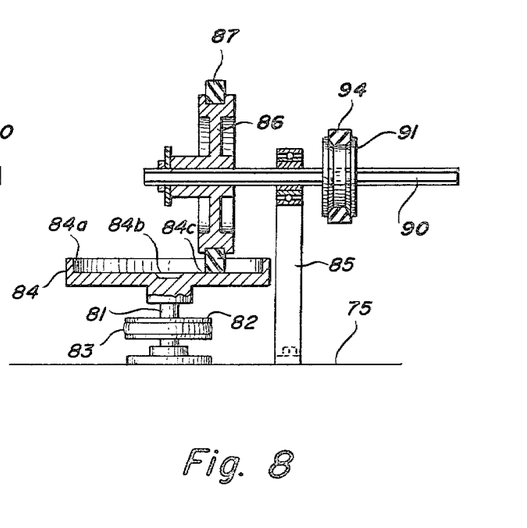

The rotary shaft 81 is capped by the disc 84 having a frictional surface adapted to engage the wheel 86 fitted with a frictional band 87 on its periphery to insure effective engagement therebetween. The plane of wheel 86 is normal to the plane of disc 84 and the point of engagement of the former with the latter determines the speed and direction of the polygonal drive shaft 90, on which wheel 86 is slidably and non-rotatably mounted. When the wheel 86 is at the extreme left of the disc, at 84a, maximum speed in a forward direction is imparted to the polygonal shaft 90, and as the wheel is shifted towards the center of disc 84, the rotary speed of shaft 90 is gradually reduced to zero, when it is positioned at 84b (FIG. 7). When the wheel 86 is shifted to the right of center, as shown in FIG. 8, the direction of rotation of shaft 90 is reversed. Thus, as fully disclosed in the above-mentioned U.S. Pat. No. 3,529,482, the movement of the wheel 86 results in a variable control of the rotary speed of shaft 90, as well as its direction.

Figure 6:
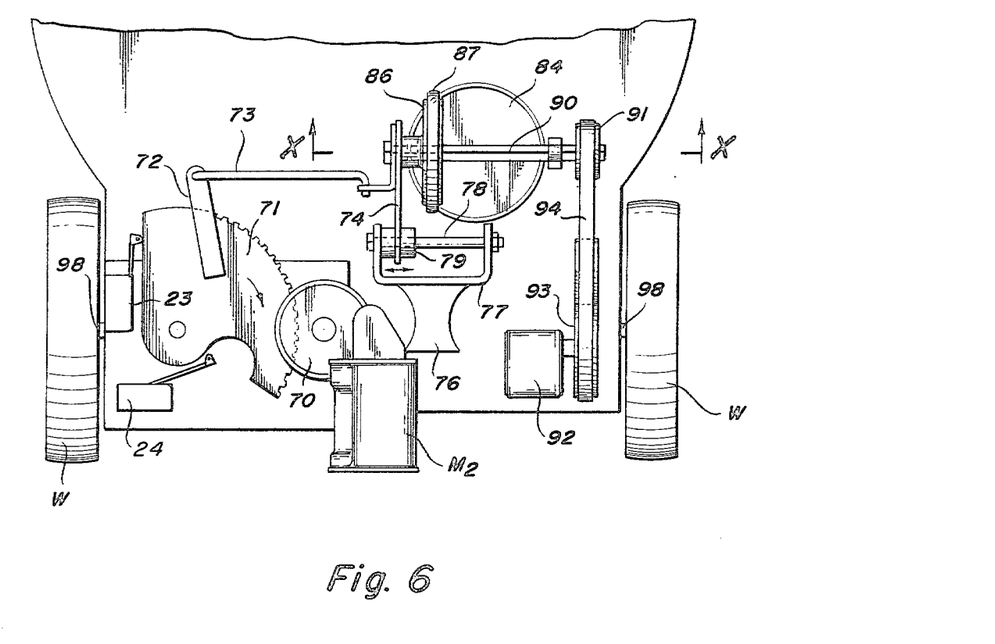
FIG. 6 is an enlarged view of the rearward portion of FIG. 2, illustrating more clearly the control mechanism for the drive shaft to vary the speed and direction of propulsion of the lawn mower and showing the parts in position for maximum advance in the forward direction.

In order to effectuate this variable control of drive shaft 90, a bracket 76 is mounted on the top of the frame housing for supporting bifurcated frame 77 in which is mounted a guide bar 78. A sleeve 79 is shiftable on the guide bar and supports one end of a connector member 74, the opposite end of which is adapted to shift the hub of wheel 86 along drive shaft 90 between its limiting positions 84a and 84c as shown in FIGS. 6 and 8. One or more vertical supports 85 are mounted on the top wall 75 of the housing with roller bearings at the upper end thereof for supporting the rotary shaft 90.

The second one of the control motors M2, similar to the motor M1 described above, for controlling the steering of the motor, is mounted on the frame and serves to drive the sector gear 71 through the intermediary of the reduction gearing 70, as shown in FIG. 6. An arm 72 is rigidly affixed to gear sector 71, from which extends a link 73 to actuate the connector member in a to-and-fro direction as the sector gear rotates in a clockwise and counterclockwise direction as controlled by the reversible motor M2.

Limit switches 23 and 24 are mounted on the frame and are controlled by the movement of the sector gear 71.

The variable motion transmitted from the controllable drive shaft 90 is transmitted to the traction wheels W by means of pulley 91 mounted on shaft 90 and the driven pulley 93 on the differential transmission 92, the output of which is transmitted to the axle 98, on which are mounted the traction wheels W. The pulleys 91 and 93 are spanned by an endless transmission belt 94. On the inside of the belt loop and below the upper flight thereof, is disposed an idler pulley 120, which is capable of assuming alternate positions to loosen or tighten the belt 94 to engage and disengage the driving movement between pulleys 91 and 93, as more fully set forth hereinafter.

Figure 13:
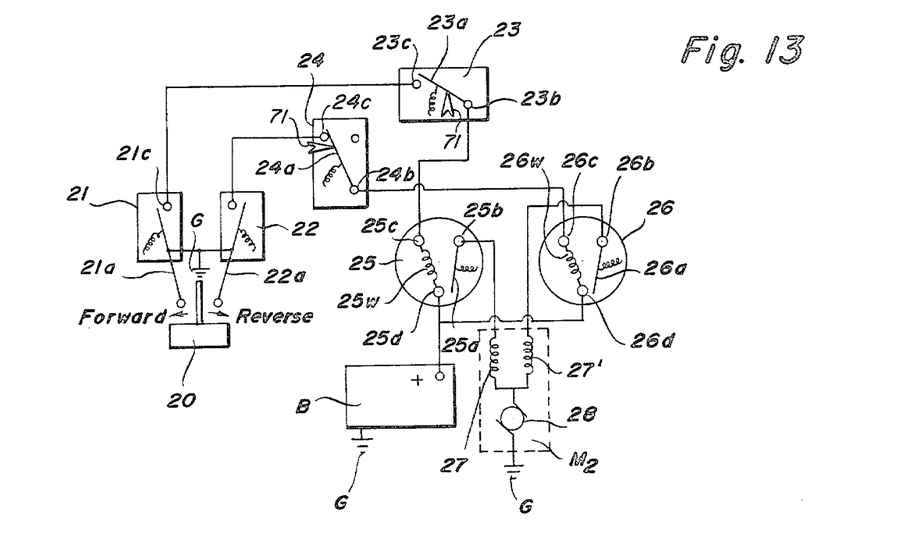
FIG. 13 is a circuit diagram of the electrical components for controlling the speed and direction of propulsion of the mower.

When the control lever L2 is in neutral position and is shifted upwardly in a vertical plane, for the forward movement of the mower, the radio signal transmitted from the transmitter T actuates servo 20 (FIG. 13) so that microswitch 21 is operated. However, in view of the fact that the wheel 86 had been brought to the position shown in FIG. 6 for maximum speed of the drive shaft in the previous operation, which opened limit switch 23, no circuit can be made to the motor M2 through relay 25 for forward operation until gear sector 71 has moved in a reverse clockwise direction to permit limit switch 23 to close.

A reduction in speed in the drive shaft 90 is effected by shifting lever L2 in a downward direction which actuates microswitch 22 to complete a circuit through closed limit switch 24, through winding 26w between contacts 26c and 26d of relay 26 to battery B and ground. The attraction of armature 26a of the relay 26 completes the circuit from ground, battery B, armature 26a, field winding 27' and armature 28 of motor M2, and ground, which operates motor M2 to rotate sector gear 71 in a clockwise direction. This motion can be arrested by releasing lever L2 which breaks the relay and motor circuit at microswitch 22. The setting of the wheel 86 on disc 84, remains in place to attain a reduced speed of drive shaft 90. If lever L2 is not released, the relay and motor circuit through field winding 27' is operative until the bottom curved edge 71' of sector 71 operates limit switch 24 to break the relay and motor circuit at that point, at which time the wheel 86 is in the position shown in FIG. 8, for reverse operation.

When the wheel 86 is in any position to the right of that shown in FIG. 6, the speed of shaft 90 may be increased by raising lever L2 as stated above. Servo 20 is actuated thereby to close microswitch 21 between armature 21a and contact 21c which now completes the circuit from ground through this microswitch through normally closed limit switch 23 (between contacts 23b and 23c spanned by armature 23a), through winding 25w between contacts 25c and 25d of relay 25, to battery B and ground. The energization of relay 25 attracts its armature 25a which completes the circuit from battery B, field winding 27 and armature 28 of motor M2.

The rotation of the motor serves to rotate gear sector 71 in a counterclockwise direction to bring disc 86 into the position shown in FIG. 6, at which time limit switch 23 is opened to stop the motor M2, which leaves the transmission in position for maximum speed.

The lever L1 on the transmitter serves to control servomotors which act directly on the engine to control the fuel feed thereto, as well as to stop the engine completely. These functions are performed by shifting lever L1 downwardly to exercise the former control on the engine carburetor and by shifting the lever upwardly to inactivate of "kill" the engine by cutting off the fuel supply or cutting out the ignition.

Figure 4:
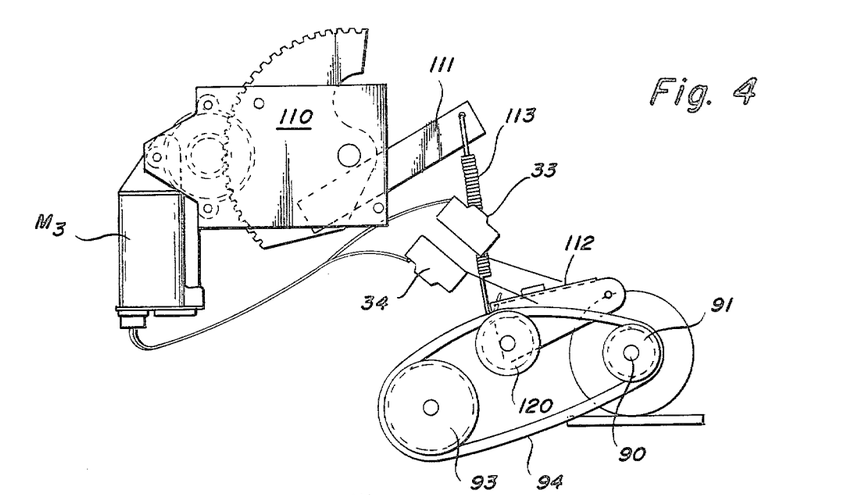
FIGS. 4 and 5 are vertical sectional views along line 4—4 of FIG. 2, on enlarged scales, when the clutching idler pulley is in inoperative and operative positions, respectively.

When lever L1 is shifted laterally to the left, nothing happens because this channel is an idle one and exercises no control on any instrumentality on the mower. On the other hand when the lever L1 is shifted laterally to the right, the necessary controls are imposed on the idler pulley 120 (FIGS. 4,5) to control the engagement of the latter with the top flight of the transmission belt 94 running between pulleys 93 and 94, as described above. When lever L1 is in its central or neutral position, pulley 120 is in its lowered position, as shown in FIG. 4, belt 94 runs loosely, and the mower is at a standstill. When pulley 120 is raised, the belt 94 is tautened so that motion is transmitted to pulley 93 at whatever speed drive shaft 90 rotates, in dependence of the setting of the wheel 86 on disc 84.

The raising and lowering of the idler pulley 120 is controlled by a third reversible electric motor M3, which is similar in design to motors M1 and M2, described above. This motor is mounted on the right side of the handle H and actuates gear sector 110 to which is rigidly affixed control lever 111. A coil spring 113 extends between the outer end of lever 111 and the outer end of a pivoted bracket 112, on which is mounted the idler pulley 120.

Figure 14:
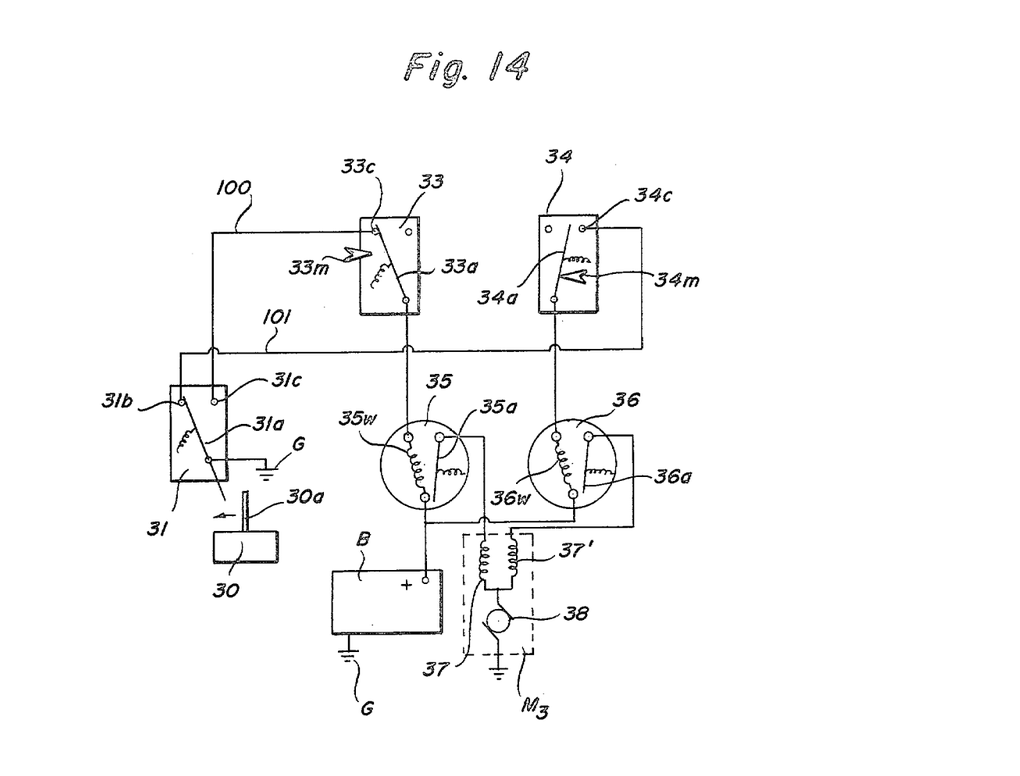
FIG. 14 is a circuit diagram for controlling the clutching and declutching of the transmission of the drive to the traction wheels.

Actuation of control lever L1 at the transmitter (FIG. 15) to the right, operates servomotor 30 and its microswitch 31 (FIGS. 11 and 14) in the control box to shift armature 31a from contact 31b to 31c. The circuit to motor M3 was inactivated by virtue of the break in the limit switch 34 at the clutching station between its contact 34c and armature 34a by the action of the control lever 34m when the idler pulley and its support bracket travelled downwardly to their lowered position. Now, in consequence of the connection of grounded terminal G, armatures 31a and 33a through conductor 100, a circuit is completed through relay 35, battery B and ground to complete the circuit of motor M3 from grounded battery B, armature 35a, field winding 37 and armature 38 of motor M3. The motor M3 operates in a direction to rotate gear sector 110 in a counterclockwise direction to move control lever 111 affixed thereto from the position shown in FIG. 4 to that shown in FIG. 5. The pivoted supporting bracket 112 for the idler pulley 120, which is connected to the outer end of lever 111 through coil spring 113, is rocked upwardly to tauten the upper flight of transmission belt 94. This serves to transmit rotary motion from the drive shaft 90 to the input pulley 93 of the differential and ultimately to the driving axle 98 and traction wheels W.

Figure 5:
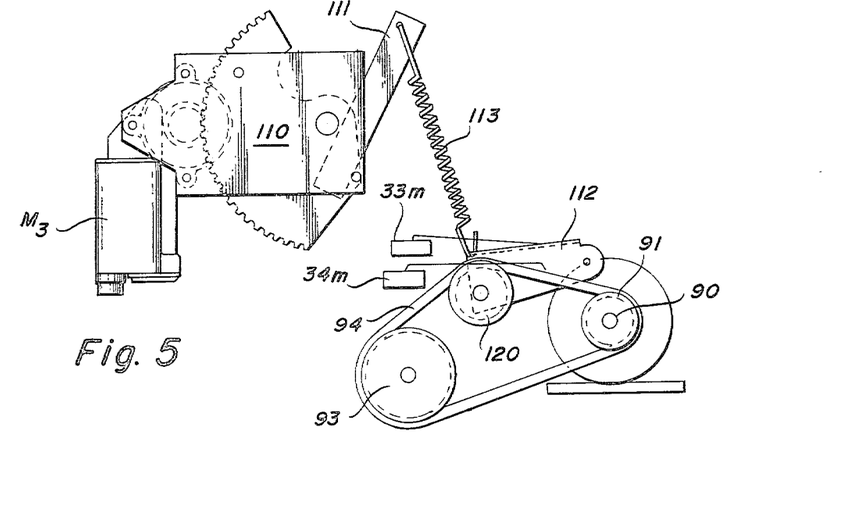

The motor M3 is inactivated when the parts attain the position shown in FIG. 5 by the operation of a control lever 33m on the support bracket 112 which acts on limit switch 33 to break contact of its armature 33a with its terminal 33c. While relay 35 is deenergized, the motor M3, gear sector 110 and related parts remain in set position as long as the control lever is held in operative position by the operator. This results in the movement of the tractor wheels W and the lawn mower in either the forward or reverse direction at any speed which has been imparted to the drive shaft 90 by the motor M2 and the mechanisms operated thereby.

Should the operator wish to arrest the travel of the lawn mower, it is necessary that the control lever at the transmitter be released. In nearly all instances this is a voluntary act on the part of the operator as he handles the portable transmitter. On the other hand, in the case of an accident to the operator, or other mishap, this provides a "dead man's control" and a safety measure which stops the travel of the lawn mower before any collisions or any damage can occur.

A release of the control lever L1 at the transmitter, releases armature 30a of servomotor 30 for return movement and permits armature 31a of microswitch 31 to return to contact 31b. Since lower limit switch 34 is distant from control lever 34m on the idler pulley bracket support, the latter offers no restraint on the contact between armature 34a and 34c and thus relay 36 is energized by a circuit from grounded terminal G of armature 31, contact 31b, conductor 101, contact 34c, armature 34a and winding 36w of relay 36, battery B and ground. Upon attraction of armature 36a of relay 36, a circuit is completed through field winding 37' of motor M3 which effects rotation of the motor in a reverse direction to bring the parts into the positions shown in FIG. 4. The motor is stopped when the control lever 34m associated with the idler pulley bracket support, acts on the lower limit switch 34 and breaks the connection between armature 34 and contact 34c. With the parts positioned in this manner, the travel of the lawn mower may be initiated anew by operation of the control handle at the transmitter which operates the servomotor 30 and microswitch 31 to energize the motor M3 for raising the idler pulley.

Many changes may be made to the apparatus and system described above which fall within the spirit of the invention. If the engine on the lawn mower is provided with an electric starter, the movement of control lever L1 to the left, which in the system described above exercises no effect, may be used to transmit a distinctive signal to the receiver 40, to control the starter. Also, the system may be adapted to control other types of farm machinery having ground-working tools, such as tractors, snow-blowers, etc.

I claim:

1. A remotely controlled engine-operated power lawn mower having a rotary cutting blade, comprising
  (a) a frame including a housing for said blade with actuating means therefor mounted at the top of said housing.
  (b) a pair of traction wheels with common drive means therefor at one end of said frame, and a ground-engaging steering wheel in an adjustable vertical plane at the opposite end thereof,
  (c) transmission means extending between said actuating means and said traction wheels comprising a horizontally disposed drive shaft, with means for adjusting the rotary speed and direction thereof,
  (d) single clutch means between said drive shaft and traction wheels for selectively controlling the actuation of the latter,
  (e) reversible electric motors with mechanical connections from each for adjusting, respectively, the vertical plane of said steering wheel, the speed and direction of said drive shaft, and the operative and inoperative positions of said clutch means, and (f) electric circuit means mounted on said mower comprising a radio receiver, an energy source, servomotors, and relays adapted to be operated by radiant energy from a transmitter held by an operator at a remote point adapted to send signals of differentiating characteristics for selectively controlling said steering wheel, drive shaft and clutch means.

2. An apparatus as set forth in claim 1, wherein said actuating means for said rotary blade is constituted by an internal combustion engine including a carburetor for feeding a regulated supply of fuel to said engine.

3. An apparatus as set forth in claim 2, including a servomotor operated by said receiver which is responsive to radiant energy of an additional distinctive characteristic for controlling said carburetor and correspondingly the engine speed.

4. An apparatus as set forth in claim 1, wherein said last-mentioned electric circuit means comprises microswitches which, together with said radio receiver, servomotors and relays, are mounted in a common enclosure on said mower, and said energy source is a storage battery.

5. An apparatus as set forth in claim 1, wherein said mechanical connections with said motors each comprises a worm-and-wheel reduction gear driven by said motor, and a sector gear actuated by said last-mentioned gear.

6. An apparatus as set forth in claim 5, including a control lever affixed to one of said sector gears and movable therewith in a substantially horizontal plane by the energization of one of said motors.

7. An apparatus as set forth in claim 6, including a bifurcated support for said steering wheel at the front end of said frame and a mechanical linkage between the upper end of said support and the outer end of said control lever.

8. An apparatus as set forth in claim 7, wherein said one motor is mounted on said frame at an elevated level of the midportion thereof and limit switches are mounted on said frame and operable by said control lever for limiting the angular positioning of said bifurcated support from the longitudinal axis of said frame.

9. An apparatus as set forth in claim 8, wherein said mechanical linkage is adjustable in length to attain a fine control of said limit switches by said control lever.

10. An apparatus as set forth in claim 9, wherein the capability of the angular movement of said sector gear is controllable to limit correspondingly the extent of movement of the steering wheel to less than 30° from each side of the longitudinal axis of said frame.

11. An apparatus as set forth in claim 10, wherein the range of angular movement of the steering wheel is approximately 52°.

12. An apparatus as set forth in claim 1, wherein said transmission means includes a differential mechanism between said adjustable drive shaft and traction wheels.

13. An apparatus as set forth in claim 1, wherein said transmitter is a multi-channel digital proportional radio control transmitter provided with two control handles, one of said handles adapted to be moved in a horizontal to-and-fro direction for controlling the steering of the motor to the right and left, in an upward direction to control the propulsion of the mower forwardly at an adjustable speed, and in a downward direction to control the propulsion of the mower at a reduced speed, as well as rearwardly.

14. An apparatus as set forth in claim 3, wherein said transmitter is a multi-channel digital proportional radio control transmitter provided with two control handles, one of said handles adapted to be moved in a horizontal to-and-fro direction for controlling the steering of the motor to the right and left, in an upward direction to control the propulsion of the mower forwardly at an adjustable speed, and in a downward direction to control the propulsion of the mower at a reduced speed, as well as rearwardly, and the other control handle is adapted to be moved in a lateral direction to control said clutch means, in a downward direction to control the said carburetor and engine speed, and in an upward direction for inactivating said engine.

15. A remotely controlled engine-operated power lawn mower having a rotary vertical shaft with a rotary cutting blade mounted on the lower end thereof, comprising (a) a frame including a housing for said blade with actuating means therefor mounted at the top of said housing, (b) a pair of traction wheels mounted on an axle at one end of said frame, and a ground-engaging steering wheel in an adjustable vertical plane at the opposite end thereof, (c) transmission means comprising a bracket mounted on the top of said frame housing, a horizontal drive shaft supported on said bracket for free rotation on an axis parallel to the axis of said traction wheels and in proximity thereto, an adjustable friction disk-and-wheel transmission between said last-mentioned drive shaft and said rotary vertical shaft of said cutting blade, comprising a rotary circular friction disk driven by said vertical shaft, a transversely disposed rotary wheel disposed for only slideable movement on said drive shaft with the periphery thereof in frictional contact with said disk, and means for positioning said wheel at variable radial displacements from the rotary axis of said friction disk for adjusting the rotary speed and direction of said drive shaft, (d) clutch means between said drive shaft and traction wheels for selectively controlling the actuation of the latter, (e) reversible electric motors with mechanical connections from each for adjusting, respectively, the vertical plane of said steering wheel, the speed and direction of said drive shaft, and the operative and inoperative positions of said clutch means, and (f) electric conduit means mounted on said mower comprising a radio receiver, an energy source, servomotors, and relays adapted to be operated by radiant energy from a transmitter held by an operator at a remote point adapted to send signals of differentiating characteristics for selectively controlling said steering wheel, drive shaft and clutch means.

16. An apparatus as set forth in claim 15, wherein the means for positioning the wheel of said friction disk-and-wheel transmission comprises (a) a guide bar mounted on said bracket rearwardly of said drive shaft and in parallel thereto, (b) a sleeve movable on said guide bar, (c) a slideable support for said wheel mounted on said drive shaft, and (d) a connector between said sleeve and support adapted for translating movement.

17. An apparatus as set forth in claim 16, wherein one of said electric motors with a sector gear driven thereby is mounted on said frame, and actuating means extending between said sector gear and connector.

18. An apparatus as set forth in claim 17, including a pair of limit switches in the path of movement of said sector gear and adapted to be controlled thereby to stop said electric motor at the positioning limits of said friction wheel, corresponding to the maximum speed of travel of said traction wheels in a forward direction and a reduced speed of travel in the reverse direction.

19. A remotely controlled engine-operated power lawn mower having a rotary cutting blade, comprising
   (a) a frame including a housing for said blade with actuating means therefor mounted at the top of said housing,
   (b) a pair of traction wheels mounted on an axle at one end of said frame, and a ground-engaging steering wheel in an adjustable vertical plane at the opposite end thereof,
   (c) transmission means extending between said actuating means and said traction wheels comprising a horizontally disposed drive shaft, with means for adjusting the rotary speed and direction thereof, said transmission means including a differential on the axle of said traction wheels with an actuating pulley therefor driven by said adjustable drive shaft,
   (d) clutch means between said drive shaft and traction wheels for selectively controlling the actuation of the latter, comprising a driving pulley on said drive shaft co-planar with said actuating pulley, an endless band extending between said pulleys, and a movable idler pulley therebetween adapted to assume alternate positions, one of which loosens the band and the other tautens the band to effect the transmission of motion between said first-mentioned pulleys,
   (e) reversible electric motors with mechanical onnections from each for adjusting, respectively, the vertical plane of said steering wheel, the speed and direction of said drive shaft, and the operative and inoperative positions of said clutch means, and
   (f) electric circuit means mounted on said mower comprising a radio receiver, an energy source, servomotors, and relays adapted to be operation by radiant energy from a transmitter held by an operator at a remote point adapted to send signals of differentiating characteristics for selectively controlling said steering wheel, drive shaft and clutch means.

20. An apparatus as set forth in claim 19, including a movable bracket for supporing said idler pulley, a sector gear driven by another one of said electric motors, and a yieldable connection between said bracket and sector gear for moving said idler pulley between its two positions.

21. An apparatus as set forth in claim 20, including a pair of limit switches in the path of movement of said bracket and adapted to be controlled thereby to stop said last-mentioned motor at the conclusion of the engaging and disengaging movements of said idler pulley, respectively.

22. A remotely controlled engine-operated power lawn mower having a rotary cutting blade comprising an internal combustion engine with a carburetor for feeding a regulated supply of fuel to said engine,
   (a) a frame including a housing for said blade with said engine actuating means therefor mounted at the top of said housing,
   (b) a pair of traction wheels mounted on an axle at one end of said frame, and a ground-engaging steering wheel in an adjustable vertical plane at the opposite end thereof,
   (c) transmission means extending between said actuating means and said traction wheels comprising a horizontally disposed drive shaft, with means for adjusting the rotary speed and direction thereof,
   (d) clutch means between said drive shaft and traction wheels for selectively controlling the actuation of the latter,
   (e) reversible electric motors with mechanical connections from each for adjusting, respectively, the vertical plane of said steering wheel, the speed and direction of said drive shaft, and the operative and inoperative positions of said clutch means,
   (f) electric circuit means mounted on said mower comprising a radio receiver, an energy source, servomotors, and relays adapted to be operated by radiant energy from a transmitter held by an operator at a remote point adapted to send signals of differentiating characteristics for selectively controlling said steering wheel, drive shaft and clutch means, and
   (g) an additional servomotor operated by said receiver which is responsive to radiant energy of an additional distinctive characteristic for controlling said carburetor and correspondingly the engine speed including a distinctive signal for stopping the engine therewith.

23. An apparatus of the class described comprising
   (a) a rotary main shaft adapted to be actuated by an internal combustion engine,
   (b) a frame for supporting said engine and rotary shaft,
   (c) a pair of traction wheels mounted on an axle at one end of said frame, and a ground-engaging steering wheel in an adjustable vertical plane at the opposite end thereof,
   (d) transmission means extending between said main shaft and said traction wheels comprising a horizontally disposed drive shaft, with means for adjusting the rotary speed and direction thereof,
   (e) clutch means between said drive shaft and traction wheels for selectively controlling the actuation of the latter,
   (f) reversible electric motors with mechanical connections from each for adjusting, respectively, the vertical plane of said steering wheel, the speed and direction of said drive shaft, and the operative and inoperative positions of said clutch means, and
   (g) electric circuit means mounted on said frame comprising a radio receiver, an energy source, servomotors, and relays adapted to be operated by radiant energy from a transmitter held by an operator at a remote point adapted to send signals of differentiating characteristics for selectively controlling said steering wheel, drive shaft and clutch means comprising a servomotor operable by said receiver, an armature movable in opposite directions by a pair of signals of different characteristics, a pair of normally open switches, each adapted to be closed selectively by the alternative movement of said armature in each direction, a pair of circuits each comprising said energy source and a relay adapted to be completed by each of said switches in closed position, a relay switch adapted to be closed by the energization of the respective relay, a pair of motor circuits each comprising said energy source, one of said reversible electric motors having an armature and a pair of oppositely wound field windings adapted to be energized selectively to rotate said armature in opposite directions and one of said last-mentioned relay switches, to complete one of said motor circuits through one of said field windings, and a secondary switch in circuit with each of said first-mentioned switches to impose a secondary control on said relay switches.

24. An apparatus as set forth in claim 23, wherein said last-mentioned secondary switches are normally closed limit switches adapted to break the relay circuits and motor circuits at the end of a predetermined extent of travel of the device actuated by said last-mentioned electric motor.

25. An apparatus as set forth in claim 24, wherein said last-mentioned device is said steering wheel.

26. An apparatus as set forth in claim 23, wherein said last-mentioned secondary switches impose a secondary control on said relay circuits and motor circuits to adjust the device actuated by said last-mentioned motor.

27. An apparatus as set forth in claim 26, wherein said last-mentioned device is said adjustable drive shaft.

28. An apparatus of the class described comprising
  (a) a rotary main shaft adapted to be actuated by an internal combustion engine,
  (b) a frame for supporting said engine and rotary shaft,
  (c) a pair of traction wheels mounted on an axle at one end of said frame, and a ground-engaging steering wheel in an adjustable vertical plane at the opposite end thereof,
  (d) transmission means extending between said main shaft and said traction wheels comprising a horizontally disposed drive shaft, with means for adjusting the rotary speed and direction thereof,
  (e) clutch means between said drive shaft and traction wheels for selectively controlling the actuation of the latter, comprising a movable idler pulley mounted in a bracket which is shiftable between two alternate positions to effect the drive engaging and disengaging functions of said traction wheels,
  (f) reversible electric motors with mechanical connections from each for adjusting, respectively, the vertical plane of said steering wheel, the speed and direction of said drive shaft, and the operative and inoperative positions of said clutch means, and
  (g) electric circuit means mounted on said frame comrising a radio receiver, an energy source, servomotors, and relays adapted to be operated by radiant energy from a transmitter held by an operator at a remote point adapted to send signals of differentiating characteristics for selectively controlling said steering wheel, drive shaft and clutch means comprising a servomotor operable by said receiver having an armature movable in one direction by a distinctive signal from said transmitter which is controlled by the physical force of the operator, a first switch having a lever selectively contacting a pair of terminals, each of said terminals connected to a limit switch operable by said bracket at its respective alternate positions and including a circuit-making spring-biased lever for completing a relay circuit through said first switch, a relay winding and said energy source, a relay switch adapted to be closed by the energization of the respective relay, and a pair of motor circuits each comprising said energy source, one of said reversible electric motors having a rotary armature and a pair of oppositely wound field windings adapted to be energized selectively to rotate said armature in opposite directions, and one of said last-mentioned relay switches to complete one of said motor circuits through one of said field windings.

29. An apparatus as set forth in claim 28, wherein the lever of said first switch is biased towards one of said terminals in the latter, so that release of the physical force by the operator at the transmitter, either voluntarily or accidentally, completes the motor circuit for moving the idler pulley into disengaging position, at the conclusion of which movement the motor is stopped in consequence of the circuit interruption at the first-mentioned spring-biased lever of said respective limit switch.

30. A remotely controlled power-operated apparatus of the class described having a ground-working tool and comprising
  (a) a frame and an internal combustion engine supported thereby,
  (b) a rotary main shaft extending between said engine and tool,
  (c) a pair of traction wheels with common drive means therefor at one end of said frame and a ground-engaging steering wheel in an adjustable vertical plane at the opposite end thereof,
  (d) transmission means extending between said main shaft and said traction wheels comprising a drive shaft with means for adjusting the rotary speed and direction thereof,
  (e) single clutch means between said drive shaft and traction wheels for selectively controlling the actuation of the latter,
  (f) reversible electric motors with mechanical connections from each for adjusting, respectively, the vertical plane of said steering wheel, the speed and direction of said drive shaft, and the operative and inoperative positions of said single clutch means, and
  (g) electric circuit means mounted on said frame comprising a radio receiver, an energy source, servomotors, and relays adapted to be operated by radiant energy from a transmitter held by an operator at a remote point adapted to send signals of differentiating characteristics for selectively controlling said steering wheel, drive shaft and clutch means.

31. An apparatus as set forth in claim 30, wherein said transmitter comprises a control bar adapted to be moved to-and-fro laterally in a horizontal plane from a neutral position, to transmit the necessary signal energy to said radio receiver to effect selective movement of said steering wheel to the right or left, and said control bar is also adapted to be moved to-and-fro in a vertical plane from said neutral position to transmit the necessary signal energy to said radio receiver to selectively effect an increase and decrease in speed of said traction wheels.

32. An apparatus as set forth in claim 31, wherein the reduction in speed of said traction wheels by said control bar includes zero speed corresponding to the stoppage thereof, as well as negative speed corresponding to movement of said traction wheels in a reverse direction.

33. An apparatus as set forth in claim 32, including a second control bar on said transmitter adapted to be moved from a neutral position to transmit the necessary signal energy to said radio receiver for controlling the operative and inoperative positions of said clutch means, and said last-mentioned control bar adapted to be forcefully returned to its neutral position upon release of the force required to initiate the operative positioning of said clutch means.

34. An apparatus as set forth in claim 30, having a carburetor for feeding a regulated supply of fuel to said engine, and a servomotor operated by said receiver which is responsive to radiant energy of an additional distinctive characteristic for controlling said carburetor and correspondingly the engine speed.

35. An apparatus as set forth in claim 30, having a carburetor for feeding a regulated supply of fuel to said engine, a servomotor operated by said receiver which is responsive to radiant energy of an additional distinctive characteristic for controlling said carburetor and correspondingly the engine speed, and said transmitter comprising a first control bar adapted to be moved to-and-fro laterally in a horizontal plane from a neutral position, to transmit the necessary signal energy to said radio receiver to effect selective movement of said steering wheel to the right or left, and said control bar also adapted to be moved to-and-fro in a vertical plane from said neutral position to transmit the necessary signal energy to said radio receiver to selectively effect an increase and decrease in speed of said traction wheels, a second control bar on said transmitter adapted to be moved to-and-fro from a neutral position in different planes, movement in one plane serving to transmit the necessary signal energy to said radio receiver for controlling the operative and inoperative positions of said clutch means, and also adapted to be forcefully returned to its neutral position upon release of the force required to initiate the operative positioning of said clutch means, the movement in another plane serving to control the carburetor and to inactivate the engine.

* * * * *

UNITED STATES PATENT AND TRADEMARK OFFICE
CERTIFICATE OF CORRECTION

PATENT NO. : 4,318,266
DATED : March 9, 1982
INVENTOR(S) : MAX TAUBE

It is certified that error appears in the above-identified patent and that said Letters Patent are hereby corrected as shown below:

Claim 1, column 8, line 52, the period should be a comma.

Claim 15, column 10, line 51, ""conduit" should be --circuit--.

Signed and Sealed this

Twenty-fifth Day of May 1982

[SEAL]

Attest:

GERALD J. MOSSINGHOFF

Attesting Officer — Commissioner of Patents and Trademarks